E. A. HAILWOOD.
APPARATUS FOR TESTING MINERS' SAFETY LAMPS, &c.
APPLICATION FILED NOV. 8, 1907.

990,860.

Patented May 2, 1911.
4 SHEETS—SHEET 1.

WITNESSES

INVENTOR
Ernest Arthur Hailwood
ATTY.

E. A. HAILWOOD.
APPARATUS FOR TESTING MINERS' SAFETY LAMPS, &c.
APPLICATION FILED NOV. 8, 1907.

990,860.

Patented May 2, 1911.

WITNESSES
W. P. Burke
M. Petty

INVENTOR
Ernest Arthur Hailwood
D. M. Wallace
ATT'Y.

E. A. HAILWOOD.
APPARATUS FOR TESTING MINERS' SAFETY LAMPS, &c.
APPLICATION FILED NOV. 8, 1907.

990,860.

Patented May 2, 1911.

WITNESSES
W. P. Burke
M. Pettit

INVENTOR
Ernest Arthur Hailwood

E. A. HAILWOOD.
APPARATUS FOR TESTING MINERS' SAFETY LAMPS, &c.
APPLICATION FILED NOV. 8, 1907.

990,860.

Patented May 2, 1911.
4 SHEETS—SHEET 4.

WITNESSES

INVENTOR
Ernest Arthur Hailwood

UNITED STATES PATENT OFFICE.

ERNEST ARTHUR HAILWOOD, OF MORLEY, ENGLAND.

APPARATUS FOR TESTING MINERS' SAFETY-LAMPS, &c.

990,860. Specification of Letters Patent. Patented May 2, 1911.

Application filed November 8, 1907. Serial No. 401,357.

*To all whom it may concern:*

Be it known that I, ERNEST ARTHUR HAILWOOD, a subject of the King of Great Britain and Ireland, whose postal address is 7 Gladstone Terrace, Morley, near Leeds, in the county of York, England, have invented certain new and useful Improvements in Apparatus for Testing Miners' Safety-Lamps or the Like, of which the following is a specification.

The object of my invention is to provide improved means whereby miners' safety lamps or the like may be rapidly, efficiently, safely, and with certainty, subjected to a severe gas explosion test, with a view to ascertaining whether each lamp is safe enough for use in the mine, the lamps being automatically ignited during the testing process.

In describing my invention, reference is had to the accompanying sheets of drawings, in which similar letters indicate similar parts, in which, Fig. 3 is a sectional elevation of a modified form of my invention. Fig. 4 depicts a part sectional elevation—part shown diagrammatically—of relief valve and magnetic closing device in connection with the gas cock. Fig. $4^a$ is a sectional elevation of a modified form of device, embodying my principles. Fig. 5, sectional elevation of modified form of my invention. (Fig. 5). Fig. 9, plan, taken on line G. H. (Fig. 8), part shown cut away.

Figures 1, 2:
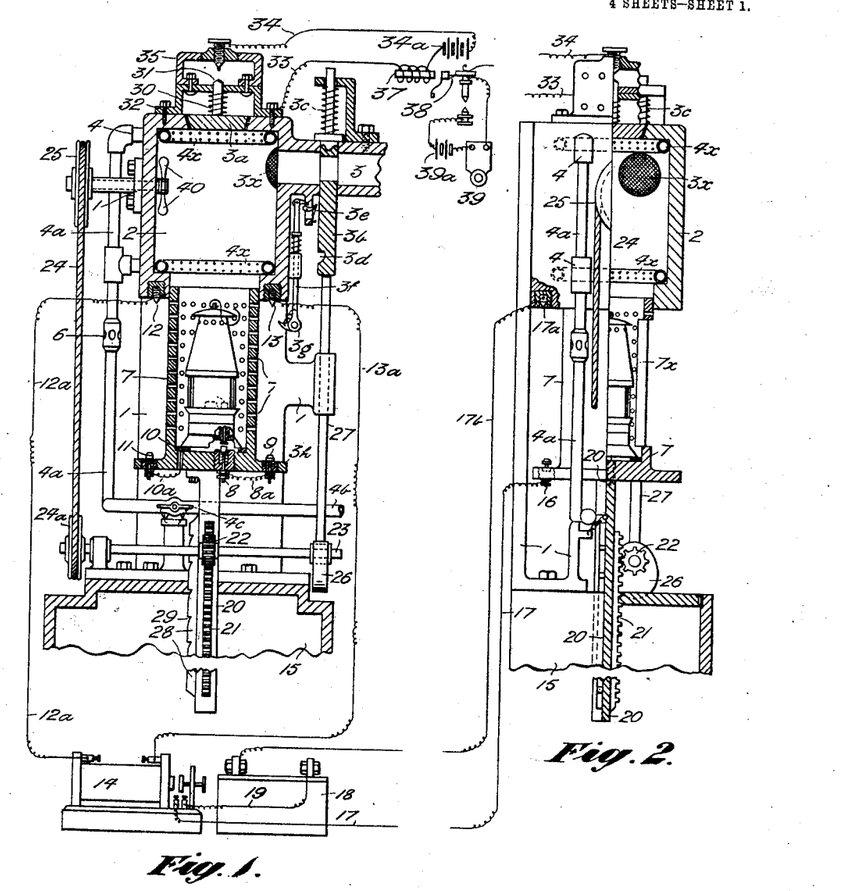
Figure 1 is a sectional elevation of my improved apparatus, (part shown cut away.)
Fig. 2 is a side sectional view of apparatus shown in Fig. 1. Fig. $2^a$ is an enlarged view of a cock in the gas main, and also of the tripping device in connection with same.
Figure 2A:
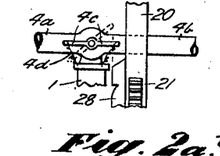

In carrying my invention into effect, I attach in any convenient manner to a bench bracket or wall bracket 1, a preferably cylindrical outer chamber 2, constructed of iron, or other suitable material. The said chamber is provided with an outlet valve 3, and relief valve $3^a$, which valves may be placed in any convenient position. Connected either horizontally or at any desirable angle with the inside of the outer chamber, I arrange at any desirable position, one or more tubes or gas mixture inlet tubes 4, the inner portion of the said inlets terminating inside the outer chamber in the form of a tubular ring or the like $4^x$, the said ring being provided with a number of perforations for the purpose of diffusing the gas mixture well on its entry into the said outer chamber. The aforesaid inlet tubes 4 are coupled up to the gas tubes $4^a$, a Bunsen air injector 6 with an adjustable air feed being arranged at any convenient place in the gas tubes or gas inlets. This Bunsen regulator is after the style of the type employed in connection with stoves or gas burners for the admission of air to the gas. Gas main $4^b$ is provided with a cock or valve having a long arm $4^c$, the said arm being connected to the valve closing spindle, the normal or off position of such arm being in a line at right angles to rod 20. Fig. $2^a$ depicts this device on a larger scale, the dotted lines showing the position of the long arm $4^c$, when same is in the open position, in manner hereinafter explained. To insure the said arm $4^c$ always returning to the normal position two springs $4^d$ (see Fig. $2^a$) are provided, one end of each spring being attached to arm $4^c$ while the other ends are attached to the framework I of the machine. The said arm $4^c$ would also be in the off position when the right hand portion in the drawing is depressed. This position would be brought about on the lowering of the rod 20.

7, Figs. 1 and 2, is what I term a base plate, into which the lamp to be tested is placed. This base plate is provided with an insulated spring action terminal 8, from which an insulated wire $8^a$ is carried to an insulated contact pin 9. 10 is a metal ring connected by means of wire $10^a$ to another outstanding terminal 11. Toward the bottom of the outer chamber 2, I arrange insulated contact pieces 12 and 13; wires $12^a$ and $13^a$ lead from the respective contact pieces to the secondary terminals of the induction coil 14, the said coil being preferably placed in a gas tight box in chamber 15. For the sake of clearness I have not shown this gas tight box. Upon chamber 15, bracket 1 rests. Another outstanding insulated terminal 16—see Fig. 2—is arranged on the said base plate 7, from which a wire or the like 17 leads to one of the primary terminals of the induction coil 14. A spring terminal 17$^a$ is also arranged toward the lower portion of outer chamber 2. From this terminal a wire 17$^b$ is connected to one pole of the accumulator or the like 18. The other pole of such generator is connected by means of wire 19 to the other pole of the induction coil 14.

The upper portion of base plate 7 is made to have a sliding fit within the mouth of the cylinder 2. The walls of the said base plate may be pierced so as to allow the gas mixture to circulate within same. The said base plate is supported by the rod 20, the latter being provided with toothed rack or the like 21, into which teeth a pinion 22, carried on a shaft 23, engages. The said shaft 23 also carries toward one end of same a pulley 24$^a$, the latter being encircled by an endless rope or the like 24; such rope also passes over guide pulley 25 supported on bracket 1. Toward the other end of shaft 23 an eccentric, or clutch, or free wheel like cam 26 is arranged. Attached to or riding on such cam is a rod 27, on to the upper end of which a sliding outlet valve spindle or plate 3$^b$ is kept depressed by means of spring 3$^c$. A notch 3$^d$ on this valve spindle 3$^b$ engages with a spring catch 3$^e$ when the said spindle 3$^b$ has been raised in manner hereinafter explained. This catch 3$^e$ may be released by a tripping device consisting of a sliding rod 3$^f$ carried in guides attached to the outside walls of the outer chamber 2, said rod being provided with a spring hinge-like catch 3$^g$ at its lower extremity. A knocking piece 3$^h$ is arranged on the walls—outside—of the base plate 7. Rod 20 is also provided with a raised portion 28 having ratchet teeth 29. Relief valve 3$^a$, which may open in the exhaust pipe, is provided with a spring 30 which tends to keep the said valve in the closed position. The said valve also carries an upstanding pin 31, the said pin being connected by way of spring 30, frame 32, and wire 33, with one pole of a primary cell 34$^a$, the other pole of which latter is connected by means of wire 34 to a superstructure 35, such superstructure being formed on a bed of insulating material. Wire 34 in its course is wound around a soft iron magnet core 37, near one end of which a spring armature switch is arranged, the latter being in the circuit of a second primary cell 39$^a$, and trembling bell 39.

Gas main 4$^b$ is coupled up to any suitable gas supply service, such as the ordinary coal gas mains, or to a tank containing acetylene, or hydrogen, or hydrogen in combination with coal gas, or any other suitable gas. The various valves in the apparatus and the mains may be protected with perforated metal sheets or wire gauze 3$^x$.

To test a miner's safety lamp, same is placed in the base plate 7, the lamp having passed through a side opening 7$^x$, insulated conductor or conductors in the said lamp being in connection with insulated conductors 8 and 10. The rope 24 is operated, thereby causing pulley 24$^a$, shaft 23, and pinion 22 to revolve, teeth in the pinion engaging in teeth in the rack 21, causing the rod 20 carrying the base plate 7 and the lamp, to be raised up into the outer chamber 2, the base plate completely closing the mouth of the outer chamber 2. The upward travel of the rod 20 causes the projecion 28 to trip up the long arm 4$^c$ of the valve in the gas main, gas immediately flowing along the gas main 4$^b$, gas tube 4$^a$, receiving a supply of air at regulator 6, the air and gas then traveling through inlets 4 and rings 4$^x$ into chamber 2. This flow continues so long as the arm 4$^c$ is held in the up position. The period of flow may be regulated by altering the length of the projection 28. I prefer to arrange it so that just prior to the rod 20 reaching the end of its possible travel the arm 4$^c$ will slide off the lower end of the said projection, thus cutting off the gas supply just before the explosion takes place in the apparatus.

The rotation of the shaft 23 causes the free wheel cam or eccentric 26 to rapidly raise the sliding bar 27. This in turn raises outlet valve spindle 3$^b$, when spring catch 3$^e$ engages in the notch 3$^d$, thereby retaining the valve spindle in the closed position during almost the whole of the upward travel of the rod 20 and base plate 7. Upon the lamp completely entering the chamber 2, and after the base plate 7 has completely closed the mouth of such chamber, the insulated primary terminal 16 comes into contact with the primary terminal 17$^a$, the latter being arranged at any suitable place on the outside of, or in the walls of the outer chamber 2, thereby immediately closing the primary circuit, when current will flow from the accumulator or generator 18 along wire 17$^b$, through terminal portions 17$^a$ and 16 along wire 17 around the primary wires of the induction coil and back to the other terminal of the generator 18, a secondary current being immediately set up in the secondary coils of the induction coil, the secondary current traveling along wire 13$^a$ to insulated terminal piece 13, through contact piece 9, which by now would be in close contact with same, thence through wire 8$^n$, insulated terminal 8, along the insulated conductor in the lamp vessel sparking across the wick, or heating a platinum wire in the vicinity of the wick tube, and then traveling through the frame of the lamp to the other secondary ring 10, along wire 10$^a$, terminal 11, insulated terminal 12 and back to the induction coil. The flame or spark formed in the vicinity of the wick tube inside the lamp would immediately ignite the gas mixture which by now would have permeated into the interior of the lamp, a violent searching explosion ensues, and should any vital part of the lamp be missing, or out of order, the flame would be carried to and ignite the gas mixture inside the upper chamber 2, and surrounding the outside of the lamp; the force of the resulting explosion would raise the valve 3$^a$ permitting the expanded gases to escape into the exhaust or waste pipe. The raising of valve 3$^a$ causes upstanding pin 31 to come into contact with superstructure 35 immediately closing the electric circuit in which the electromagnet core 37 is situated, armature 38 would immediately be attracted to the core 37, releasing the switch of the trembling bell circuit, closing such circuit, and causing the bell to continuously ring until the operator restores the switch portion 38 to its original position. This ringing of the bell warns the operator that a defective lamp is in the apparatus. When the test is completed, the rope 24 is operated in the opposite direction. The rotation of shaft 23 and pinion 22 causes the rod 20 carrying the base plate and lamp to be lowered. During this operation the arm 4$^c$ would be depressed by the projection 28 and remain depressed until the projection 28 had passed quite out of reach of the said arm 4$^c$, when same would immediately spring to the horizontal position, ready for the next upward movement of the rod 20 and projection 28.

When the base plate 7 commences to descend, the knocking piece 3$^h$ engages with the spring catch piece 3$^g$ causing same, together with the sliding rod 3$^f$, to be lowered, when the spring catch at the upper end of rod 3$^f$ would trip over spring catch 3$^e$, thereby releasing the spring actuated valve spindle 3$^b$, which spindle would immediately descend, thereby opening the outlet valve through which the gaseous contents of the chamber 2 and base plate 7 could flow into the exhaust or waste pipe. By thus clearing the chamber after each test, the next regulated charge of gas to enter the chamber 2 would not be interfered with.

To prevent the base plate 7 being lowered too soon, teeth 29 are formed in the projection 28, into which teeth arm 4$^e$ engages, thereby preventing the downward movement of the base plate and rod 20 until the whole of the projection 28 has passed over the arm 4$^e$.

In Fig. 2, rope 24 is shown cut away, while pulley 24$^d$ has been omitted to enable the mechanism in connection with rod 20 to be brought into clearer view. For the sake of clearness the secondary wires in Fig. 1 have been shown connected up to the induction coil, while the wires 17 and 17$^b$, shown in Fig. 2, may be connected to the primary terminals of the induction coil and the accumulator. For the same reason the trembling bell device and magnetic release have been placed between Figs. 1 and 2, part being shown diagrammatically.

Figures 3, 4, 4A, 5:
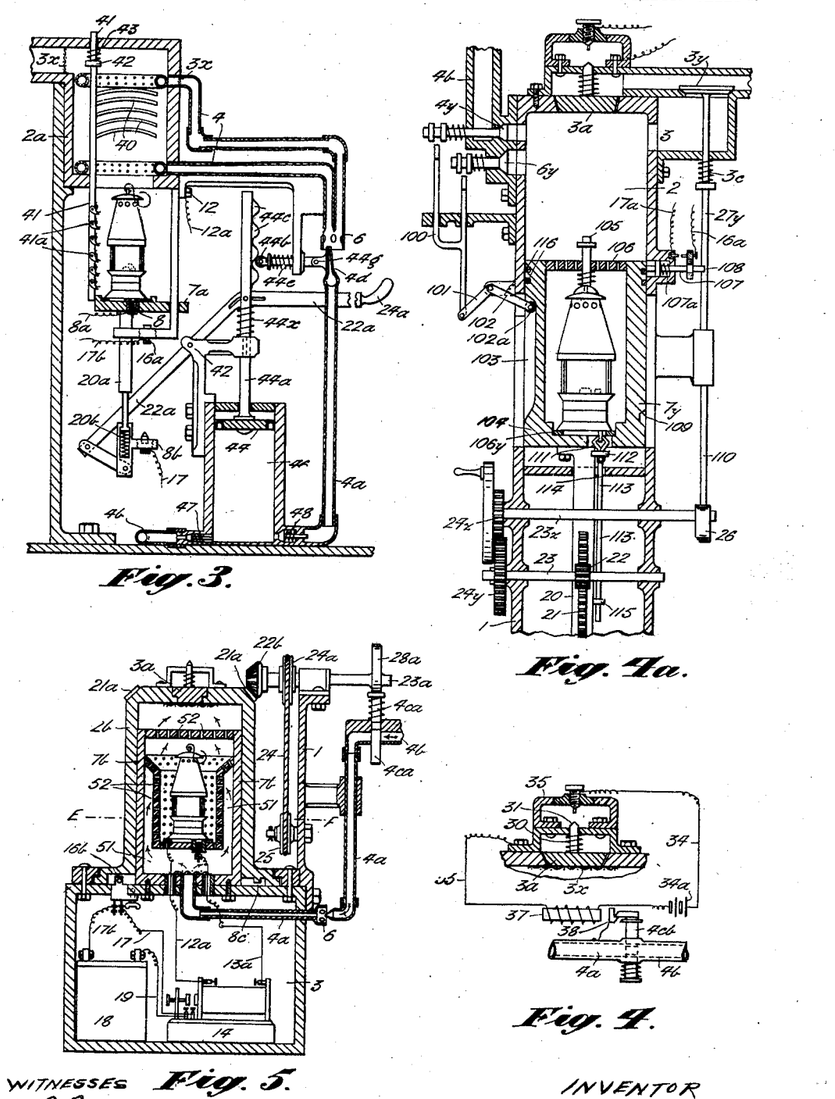

In a modified form of my invention, Fig. 3, mixing vanes 40 encircle the inside walls of the outer chamber 2$^a$, the said vanes being suitably attached, (either as a fixture or hinged) to one or more sliding rods 41, said rod having a flange 42 and spring 43 toward the upper portion thereof. A number of spring snaps 41$^a$ are arranged toward the lower portion of sliding rod 41. The rod 20$^a$ which supports the base plate 7$^a$ carries primary switch piece 8$^b$, while the other primary switch piece 16$^a$ is suitably attached to the framework 1 of the apparatus. Lever 22$^a$ is suitably fulcrumed in bracket 42, one end of such lever being suitably attached to rod 20$^a$. The other end of lever 22$^a$ is shaped into handle 24$^a$. Piston rod 44$^a$ is attached at a convenient point to lever 22$^a$. The lower extremity of the said piston rod takes into a piston block 44, the latter being provided with leather rings to make an air or gas tight joint with the cylinder 46. The latter is provided with valves 47 and 48, the former being placed at the entrance to the gas main 4$^b$, while valve 48 is placed at the entrance to tube 4$^a$, the latter tube being connected through Bunsen regulator 6 and inlets 4 with the chamber 2$^a$. Spring 44$^x$ tends to keep the lever handle 24$^a$ in the up position. Secondary terminal 8 is arranged in the base plate 7$^a$, and connected up to the secondary of the induction coil in manner aforesaid. The other secondary terminal of the induction coil is connected to nut 12 in connection with the framework of the apparatus, the secondary current passing from this nut through the framework to the base plate 7$^a$, this latter taking the place of ring 10 in Figs. 1 and 2, for the purpose of completing the secondary circuit through the lamp. The upper portion of the piston rod 44$^a$ is provided with a serrated projection 44$^c$ against which a roller 44$^b$ carried on sliding bar 44$^e$ is pressed by the action of a spring coiled around bar 44$^e$. The latter is carried in a suitable bracket attached to the framework of the apparatus, the bar being hinged at 44$^g$ to a portion 4$^d$ of gas tube 4$^a$. The mouth of 4$^d$ opens into a chamber formed at the joint extremity of the two inlets 4. The other extremity of portion 4$^d$ is secured to gas tube 4$^a$ by means of a ball joint. To operate this form of my invention, a lamp is placed on base plate 7$^a$, the handle 24$^a$ depressed, thereby forcing the piston rod 44$^a$ and block 44 down into the pump cylinder 46 causing gas, which at the last upward movement of piston block 44 had been sucked into the said pump cylinder, to be forced at a great pressure through valve 48, gas tube 4$^a$, portion 4$^d$, Bunsen injector 6, and inlets 4 into the outer chamber $2^a$. This movement of handle $24^a$ and lever $22^a$ simultaneously raises rod $20^a$ and base plate $7^a$, the latter carrying the lamp, up into outer chamber $2^a$, when at a desired moment after the base plate $7^a$ has closed the mouth of the chamber $2^a$, the primary switch piece $8^b$ will come into contact with the corresponding portion $16^a$ thereby completing the primary circuit and causing secondary current to pass through the lamp, causing a flame or spark in the vicinity of the wick tube in manner aforesaid. The raising of the base plate $7^a$ causes a projection on same to come into contact with one of the spring snaps $41^a$ causing the sliding rod 41 to rise until the flange 42 comes into contact with the walls of the chamber $2^a$, when the said spring snap will give way before the advance of the base plate; immediately the spring snap is released, the rod 41 is by the action of the spring 43 moved downward until the second spring snap comes into contact with the aforesaid projection on the base plate, when the sliding rod will be again moved upward and downward. These movements will continue to take place until the whole of the spring snaps have been passed over by the projection on the base plate $7^a$. By this oscillation of the rod 41, the vanes 40 attached to same receive a corresponding movement and thus stir up and well mix the gaseous contents of the outer chamber $2^a$. (In Fig. 1 I show a method whereby the vanes 40 may be carried on a shaft, and be caused to revolve by the operation of the pulley 25.) In this form of my invention I show same arranged so that the gas mixture may continue flowing at a great velocity into the chamber $2^a$ for a short time after the base plate has closed the mouth of the outer chamber $2^a$, and before or after the primary circuit is closed, the switch parts being arranged at a suitable distance apart on rod $20^a$ to come into contact at a desired moment. The manner of permitting the gas to continue flowing after the base plate has closed the mouth of the outer chamber $2^a$, is attained by fitting a spring cushion device $20^b$ in rod $20^a$, thereby permitting the continued movement of the handle $24^a$, lever $22^a$, and piston rod $44^a$ and piston block 44, so that gas continues to be forced into outer chamber $2^a$. The cylinder 46 would be made of suitable dimensions to permit this continued movement of the piston block within same. With this form of my invention I have also shown a permanently open outlet valve for the escape of the surplus or exploded gas into the exhaust. The opening would, however, have a sheet of gauze mesh $3^x$ to prevent flame passing through. Still referring to Fig. 3, the gas mixture traveling along tube $4^a$ is caused to enter first one inlet tube and then the other, thereby causing the gas mixture to impinge on the lamp in the chamber, first at one angle and then another. This is accomplished by means of roller $44^b$ and sliding bar $44^e$, carrying gas tube portion $4^d$ following the serrations $44^c$ when the piston 44 is operated in manner aforesaid. By this means the mouth of $4^d$ is directed toward first one inlet and then the other, according as the roller is at the base or the summit of a serration $44^c$.

Fig. 4 shows—partially diagrammatically—my method of magnetically shutting off the gas supply to the testing apparatus. The relief valve $3^a$ and magnet circuit described in reference to Figs. 1 and 2 are in this figure shown to a larger scale. Upon the valve $3^a$ being raised by the force of the explosion within the apparatus, the circuit in connection with the primary cell $34^a$ and magnet core 37 is closed whereupon the magnet core attracts the armature 38, which releases the spring actuated valve spindle $4^{cb}$, the downward movement of which latter cuts off the supply of gas from the gas main $4^b$.

The modification shown in Fig. $4^a$ has been devised in order that the gas may be more or less compressed. My principle is in no way departed from, but the arrangement of the moving cylinders and the valves are somewhat different to those described in Figs. 1, 2, and 3. $4^b$ is the gas inlet main. $4^y$ the gas inlet valve. $6^y$ the air inlet valve. 100 shows the sliding rods for locking air and gas valves, while the chamber 2 is being exhausted. 101, the angle piece provided with spring 102; this latter always tends to pull the angle piece down so that roller end $102^a$ is running in the recess 103 formed on the sides $7^y$ of the base plate. Just about the time the base plate completely fills the chamber 2 the projection 104 will cause lever 102 to turn over and press the locking rods 100 into notches formed in the spindles of the air and gas valves $4^y$ and $4^b$, keeping same locked until the roller end $102^a$ is again able to enter the recess 103 and this would only be when the base plate has been lowered some short distance during which time the cam 26 (free wheel type) would have raised the exhaust valve $3^y$ through the medium or rod $27^y$. By this means gas and air are prevented from entering the chamber 2 until same has been exhausted of the last charge of explosive mixture. Immediately the lock bolts 100 release the air and gas valves on the downward movement of base plate gas and air are by the said downward movement of the base plate drawn into the chamber 2 ready for the next test. So that on the next upward movement of base plate carrying a lamp, the gas mixture, which would have filled the chamber 2 would first be compressed to its most explosive point, about which time the circuits as shown in the other sketches would close and subject the lamp to a severe test, or I may employ the arrangement shown at 107, which is a combined lock and switch. The sliding rod 107 is forced outward and into a recess 108 formed in the rod $27^y$, keeping same locked during the compression of the gas in the chamber 2. The lock automatically releases just about the time the base plate arrives at the end of its upward journey, by the spring $107^a$ forcing the sliding rod 107 into the recess 109 in the frame of the base plate. This lock may carry the portions of the primary switch, the two portions connected to wires $16^a$ and $17^a$ only coming together when the sliding bar 107 jumps into recess 109, i. e. when the base plate has completely entered the chamber 2. To prevent the gas being ignited by sparks forming at the base of the lamp, I rest the lamp on a soft rubber ring $106^y$, and keep the lamp hard pressed on same by means of spring actuated sliding plunger 105 carried in a cross bar 106. The base plate would be provided with piston springs 116, so as to make a tight joint with the inside walls of the chamber 2.

Figure 6:
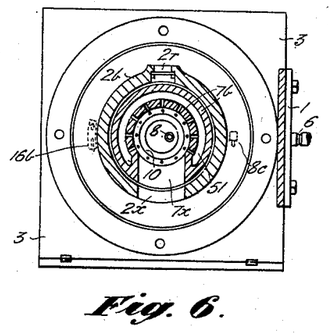
Figs. 6 and 7, sectional plans taken on line E. F.
Figure 7:
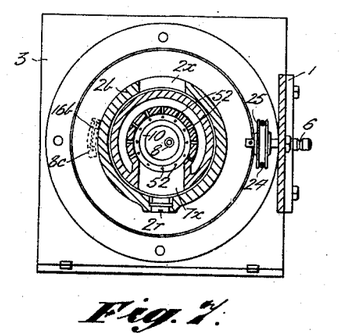

In a further modified form of my invention, see Figs. 5, 6, and 7, the upper chamber $2^b$ is movable, while the base plate $7^b$ is a fixture. The operation of rope 24 passed over pulleys $24^a$ and 25 causes shaft $23^a$, keyed to pulley $24^a$, to revolve. The said shaft $23^a$ carries at one end a bevel pinion $22^b$ which latter engages with bevel teeth $21^a$ formed on or about the crown of the outer chamber $2^b$. A free wheel like cam or eccentric $28^a$ is secured to the other end of shaft $23^a$. Valve spindle $4^{ca}$ is by means of a coiled spring pressed against the outer rim of the said cam $28^a$. The said valve spindle $4^{ca}$ forms part of the gas admittance valve on the gas main $4^b$. The gas tube $4^a$ connects the said valve through the Bunsen regulator to the chamber 51 formed in the base and sides of the base plate $7^b$. Apertures 52 placed at any convenient angle in the base and inner walls of the base plate and also in the crown of same, allow the gas mixture to circulate within the interior of the base plate and outer chamber $2^b$. The small arrows show the course the gas would most likely take. Insulated contacts or terminals in the base plate $7^b$ are connected in manner aforesaid to the secondary of the induction coil. The primary switch or push $16^b$ is carried on a detachable bracket attached in any convenient manner to the underside of the bench or chamber 3 upon which the outer chamber $2^b$ and base plate $7^b$ are supported. A push piece $8^c$ is formed or attached to the base of the outer chamber $2^b$. Wires from the primary switch $16^b$ are connected to the primary circuit of the induction coil and accumulator in manner aforesaid. Side openings or doors $2^x$, see Figs. 6 and 7, are formed in the outer chamber $2^b$, and a corresponding opening $7^x$ is formed in base plate $7^b$. To operate this form of my invention, the lamp to be tested is passed through side doors $2^x$ and $7^x$, the outer chamber having been slid along until the two openings coincide. The lamp would be placed upon insulated conductors 8 and 10 in the base plate $7^b$. Rope 24 is operated causing pulley $24^d$, shaft $23^a$, bevel pinion $22^b$ and cam $28^a$ to revolve, pinion $22^b$ engaging with the bevel teeth $21^a$ causes the outer chamber $2^b$ to travel around the stationary base plate $7^b$ until the side door $2^x$ arrives about in the position shown in plan in Fig. 7, at which moment the projection or push piece $8^c$ comes into contact with the primary push or switch $16^b$ thereby closing such switch, and completing the primary circuit, when a secondary current will be set up in the induction coil and pass through the lamp causing a spark or flame to form in same in manner aforesaid, and demonstrating the presence of a defective lamp, also in manner aforesaid. In this form of my invention, the gas mixture would be permitted to enter the base plate and outer chamber and lamp in the following manner, i. e., on the rotation of the shaft $23^a$, cam $28^a$ depresses valve spindle $4^{ca}$, opening same, and allowing gas from the gas main $4^b$ to travel along gas tube $4^a$ into the chamber 51, and through apertures 52. This flow of gas continues just as long as the cam keeps the valve spindle $4^{ca}$ depressed. I prefer to arrange the dimensions of the cam and valve spindle such that just prior to the outer chamber $2^b$ arriving at the position shown in Fig. 7, the cam will recede from the valve spindle.

Figs. 6 and 7 are sectional plans taken on line E and F, Fig. 5. In Fig. 6, pulley 25 is omitted, the lamp is also omitted from both figures.

Figure 8:
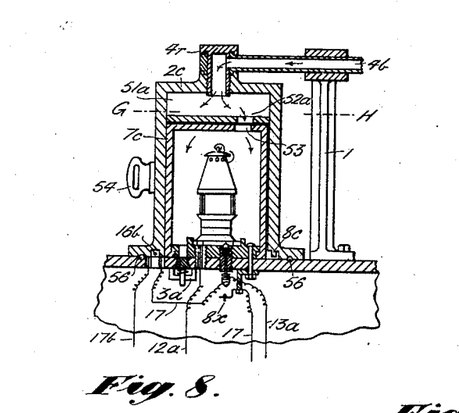
Fig. 8, sectional elevation of modified form of my invention.
Figure 9:
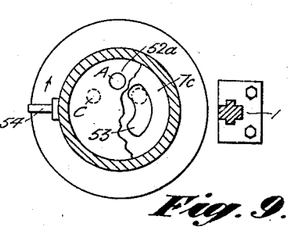

The general arrangement of the apparatus shown in Figs. 8 and 9, Fig. 9 being a sectional plan of the outer chamber, base plate and bracket 1, taken on line G. H. of Fig. 8, is somewhat after the manner of the apparatus shown in Figs. 5, 6, and 7, except that in this form the gas main $4^b$ is connected direct to a swivel joint $4^r$ arranged on the crown of the outer chamber $2^c$, the gas main always being in direct communication with a chamber $51^a$ formed in the upper portion of the outer chamber $2^c$. The base of this chamber is provided with an aperture $52^a$. The crown of base plate $7^c$ is provided with an elongated aperture 53. I, is a bracket whereby gas main $4^b$ may be supported. This arrangement has the effect of securing the outer chamber 2 on its bed without employing the flanged plate shown in Figs. 5, 6, and 7. Gas is permitted to enter this aperture by the following means. Outer chamber $2^c$ is slid around in the direction of the small arrow, Fig. 9, handle 54 being provided to assist in this operation. At the commencement of this movement the aperture 52$^a$ is in the position shown at A, Fig. 9. After a short travel of outer chamber 2$^c$ this aperture will arrive in the position shown at B; the continued movement of the outer chamber causes the said aperture to travel right across the aperture 53 until finally, position C is reached. It will be obvious that at the commencement of the aforesaid movement the gas in chamber 51$^a$ is confined to such chamber, but during the period occupied in traveling, the aperture 52$^a$ passes over the elongated aperture 53, gas will pass through the latter into the lamp and space surrounding the same, in the interior of the apparatus. Immediately the aperture 52$^a$ has passed completely over the aperture 53 the gas is automatically cut off from the lamp. The secondary circuits and primary circuits may be closed in manner aforesaid, or the primary circuit may have an additional break at 8$^x$ closed by the pressure of the lamp on a terminal passed through the base plate. A gauze protected outlet valve 3$^a$ would be placed in the base plate for the purpose of carrying off the gases in manner aforesaid. To facilitate the easy travel of the outer chamber 2$^c$, I may support same on ball or roller bearings 56.

Observation window 2$^r$ (see Figs. 6 and 7) may be placed at any convenient position on any of the apparatus.

Figure 10:
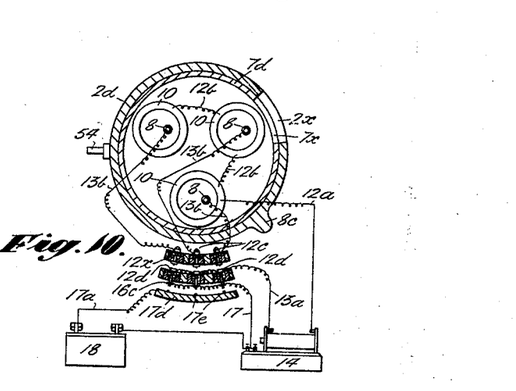
Fig. 10 is a sectional plan of a modified form of my invention. Fig. $10^a$ is a sectional elevation of a further modified form.

Fig. 10 shows sectional plan of modified form of my invention in which two or more lamps may be tested with one charge of gas. In this form the base plate is provided with a suitable number of dishes for the reception of the lamps to be tested, said dishes being provided with insulated secondary terminals 8 and 10. The secondary terminal of one dish being connected to the similar secondary terminal of its neighbor, and so on throughout the whole series of dishes, the series being connected to one terminal of the induction coil by means of wire 12$^a$. Separate wires 13$^b$ from each of the other secondary terminals of the said dishes are led to the separate push portions 12$^c$ supported on block 12$^x$, each of the push portions being surrounded by insulation material. The opposite corresponding sliding portions of such pushes 12$^d$ are all electrically wired together and connected by means of wire 13$^a$ to the other terminal of the induction coil. Each portion 12$^d$ is insulated from its neighbor, the lower end 16$^c$ of such push portions are also insulated from the front portion 12$^d$. The portions 16$^c$ are connected together by means of a wire conductor; the said wire is then carried to one of the primary terminals of the induction coil. Opposite to portions 16$^c$ a bar conductor 17$^d$ having platinum tips 17$^e$ is placed. This bar is placed in connection with one of the terminals of the accumulator 18 by means of wire 17$^a$. When the apparatus, with lamps in position has been charged with gas mixture in manner aforesaid, the outer chamber 2$^d$ is operated in manner aforesaid, when push piece or projection 8$^c$ will in due course come into contact with push portion 12$^c$ depressing same on to portion 12$^d$, thereby closing the secondary circuit in one of the dishes, and lamp on same. Portion 12$^d$ carrying contact piece 16$^c$ will in turn advance until the portion 16$^c$ comes into contact with platinum tip 17$^e$ on block or bar 17$^d$, thereby closing the primary circuit and causing a current to flow through the first lamp, subjecting the said lamp to the test hereinbefore described. The continued movement of outer chamber 24 causes projection 8$^c$ to slide free from the first push 12$^c$, immediately breaking the electric circuits, the projection 8$^c$ will then come into contact with and depress the second push 12$^c$, thereby closing the secondary and primary circuits in manner described in reference to the first push 12$^c$. This course would be pursued until the whole of the pushes had been operated in succession, and the whole of the lamps in the chamber or base plate tested.

Figure 10A:
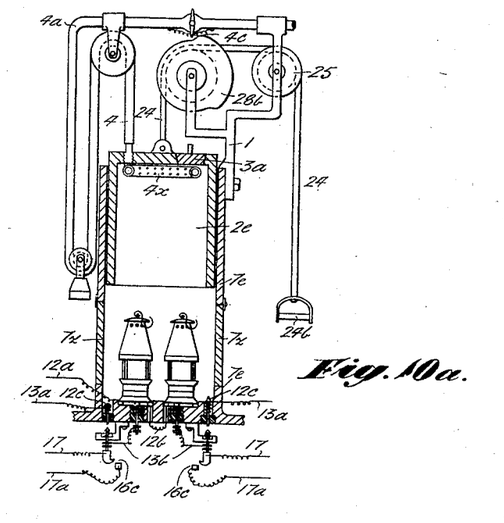

Fig. 10$^a$ shows a modified form so arranged that two or more lamps may be tested with one charge of gas. In this form base plate 7$^e$ is stationary while the upper chamber 2$^e$ may be raised or lowered in a vertical direction by means of handle 24$^b$, rope or the like 24 (the latter being passed over pulleys 25 and cam pulley 28$^b$) the revolution of the cam pulley opens or closes the gas main through the medium of the arm 4$^c$ in manner aforesaid. In this form the gas inlet 4 may be of rubber hose, and passed over a pulley. A weighted pulley is provided for the purpose of keeping the hose taut, and this without interfering with the free movement of the chamber 2$^e$. Doors 7$^z$ may be provided for the purpose of passing lamps in and out of the apparatus. The arrangement of pushes is somewhat as shown in reference to Fig. 10. The pushes in respect of the various lamps are arranged at various heights, so that the whole of the pushes in connection with one lamp are closed and broken, prior to the series of pushes in connection with the second lamp being operated by the lowering of the chamber 2$^e$, the base rim of which chamber acts as the medium for closing the various switches or pushes. Outlet pipe 3$^a$ would be connected to the exhaust pipe by means of a flexible tube or the like, this for the sake of clearness has been omitted from the drawing.

Figure 11:
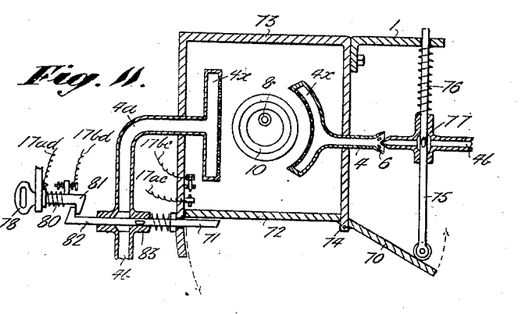
Fig. 11 is a sectional plan of a detail, and, Fig. 12 is a sectional elevation of a detail.

Fig. 11 depicts sectional plan of a modified form of my invention. In this figure 1 have, to avoid repetition, shown two methods of admitting gas mixture to the chamber provided for the reception of the lamp or lamps under test. Door 72 hinged at 74 is provided with an extension such as 70, against which, valve spindle 75 is by means of spring 76 caused to press, so that on the closing of the door 72 the said valve spindle 75 advances and opens the cock 77 placed in the gas main 4$^b$ permitting gas to enter inlet 4 and thence forward into the chamber containing the lamp or lamps. Just as the door 72 reaches the closed position the same causes two portions 17$^{bc}$ and 17$^{ac}$, placed at any convenient position, to come into contact, closing the electric circuit, and causing the lamp to be subjected to the explosion test in manner aforesaid. The other method of permitting gas mixture to enter the apparatus, shown in this figure, on the left hand side thereof, consists of a tripping piece or latch 71, which must be operated before the door 72 can be opened. This tripping piece is connected to the valve spindle 82 carried by valve 83. The other end of this spindle is shaped in the form of a hook which engages in a similar hook 81, formed on a sliding rod 80, said sliding rod having a projection carrying insulated terminal 17$^{bd}$, connected to the primary circuit. An insulated primary terminal is carried on a bracket in which the spindle 80 slides. This latter primary terminal is also in the primary circuit. The other end of the sliding spindle or rod 80 is formed into the shape of a handle 78, the operation of which first causes hook 81 to engage in the hook on valve spindle 82 drawing such valve spindle into the open position, permitting gas to enter the chamber in which the lamp is placed. This flow will continue so long as the opening in the valve spindle is in line with the opening in the valve 83, the continued operation of the handle 78 causes primary terminal 17$^{bd}$ to come into contact with primary terminal 17$^{ad}$, closing the electric circuits in manner aforesaid. The continued movement of the handle 78 eventually withdraws the tripping piece 71, and releases the door 72.

Figure 12:
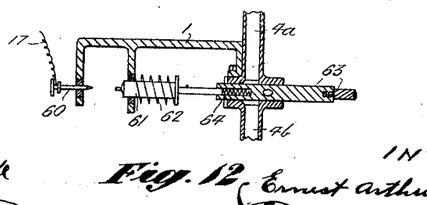

In a further modified form of my invention, I place at any convenient position on the apparatus or framework, a separate electric switch—see Fig. 12. The two portions 60 and 61 are held asunder by strong spring 62 in such a manner that to close such switch a push cock or valve spindle 63 in the gas main 4$^b$ must be pushed hard home, the pushing home of which, first of all brings into line with the gas main an aperture in the valve spindle, thereby permitting a certain amount of gas to enter the gas tube 4$^a$. and the interior of the apparatus, so as to allow a fair quantity of gas to travel through the aperture in the valve spindle. I may provide same with a spring cushion device 64 which must be closed before the switch portion of the valve spindle will travel along in the direction of portion 60. When this does eventually happen, the meeting of the two portions 60 and 61 closes the primary circuit, and a secondary current is set up in the lamp in manner aforesaid.

It will be clear that with the device hereinbefore described, the closing of the outer chamber, base plate, or door, must automatically turn on a charge of gas mixture into the interior of the said outer chamber or base plate, and must also safely and automatically switch on current through the lamp or lamps placed within such chamber or base plate, so that an apparatus constructed according to my invention may be safely and satisfactorily placed in the charge of an unskilled laborer.

I wish it to be understood that the terms door, chamber and base plate are to be regarded as synonymous.

What I claim as my invention is:—

1. An apparatus for testing miners' safety lamps, comprising a lamp chamber, such chamber having relatively moving portions and being provided with means for admitting the lamp, means for admitting an explosive mixture of gas, and means for cutting same off, means for electrically igniting the lamp when the same is safely in the testing chamber, and the chamber is closed, and means for allowing the safe escape of the ignited gases, due to an explosion, and means for indicating a defective lamp, such means being operated by the explosion, substantially as described and set forth.

2. An apparatus for testing miners' safety lamps comprising a chamber having a relatively movable portion, a gas supply to said chamber, a valve for controlling the same, a valve controlled outlet from the chamber, means for moving the movable portion of the chamber to close the same, means for allowing gas to enter the chamber operated by the closing movement, means for closing the outlet valve by said closing movement, and means for completing an electric circuit when the chamber is closed to ignite the lamp.

3. An apparatus for testing miners' safety lamps, comprising a chamber having a relatively movable portion, means for moving the movable portion for closing the chamber, means for completing an electric circuit when said chamber is closed so as to ignite the lamp, and means for allowing gas to flow into the chamber, and said means being operated by the closing movement of the chamber.

4. An apparatus for testing miners' safety lamps comprising a chamber having a relatively movable portion, a gas inlet tube to said chamber, means for moving the movable portion for closing the chamber, means operated by the closing movement for allowing the gas to flow into the chamber and then to be cut off therefrom, and means for closing an electric circuit when the chamber is closed to ignite the lamp.

5. An apparatus for testing miners' safety lamps, comprising a lamp chamber having a relatively movable portion whereby the lamp may be inserted within or withdrawn from said chamber, means for admitting gas to said chamber, an outlet valve for carrying away the gaseous contents of the lamp chamber and means for operating said valve by the movement of the movable portion of the chamber.

6. An apparatus for testing miners' safety lamps, comprising a lamp chamber having a relatively movable portion whereby the lamp may be inserted within or withdrawn from said chamber, means for admitting gas to said chamber, an outlet valve for said chamber, means for closing said valve on the movemnt of the movable portion in one direction and means for opening the valve by the movement of the movable portion in the opposite direction.

7. An apparatus for testing miners' safety lamps, comprising a lamp chamber having a relatively movable portion whereby the lamp may be inserted within or withdrawn from said chamber, a relief valve in said chamber, means for sounding an alarm on the operation of said valve and means for closing the chamber and for admitting gas thereto.

8. An apparatus for testing miners' safety lamps, comprising a lamp chamber having a relatively movable portion whereby the lamp may be inserted within or withdrawn from said chamber, means for allowing gas to flow into said chamber on the closing movement of the same and to cut off the supply when the chamber is closed, an electric circuit completed by the closing of the chamber for igniting the lamp, a relief valve lifted by an explosion in the chamber, and alarm mechanism operated by said valve.

9. An apparatus for testing miners' safety lamps comprising a lamp chamber having relatively movable portions, means for operating the movable portions to close the chamber, and means actuated by the closing movement for agitating the gas within the chamber.

10. An apparatus for testing miners' safety lamps comprising a lamp chamber having relatively movable portions, means for admitting gas to said chamber on the closing movement thereof, an exhaust valve, and means for closing the chamber and operating the exhaust valve simultaneously.

11. An apparatus for testing miners' safety lamps, comprising a chamber for receiving the lamp to be tested, a series of vanes in said chamber for agitatng the gas, means for introducing gas into said chamber, means for closing the chamber and means actuated by the closing movement for automatically operating the said vanes on or after the admittance of gas thereto.

12. An apparatus for testing miners' safety lamps comprising a chamber having a relatively movable portion, a valve controlled gas supply to said chamber, a tripping device on said valve, and means for operating the tripping device to open the valve on the closing of the chamber.

In witness whereof, I have hereunto set my hand, in the presence of two witnesses.

ERNEST ARTHUR HAILWOOD.

Witnesses:
LEWIS WAUGH,
JOSEPH F. KIRBY.

---

Copies of this patent may be obtained for five cents each, by addressing the "Commissioner of Patents, Washington, D. C."